United States Patent [19]
Klomp et al.

[11] 3,861,361
[45] Jan. 21, 1975

[54] ROTARY ENGINE WITH PISTON SCAVENGED PRECOMBUSTION CHAMBERS

[75] Inventors: Edward D. Klomp, Mt. Clemens; Rodney J. Tabaczynski, Birmingham, both of Mich.

[73] Assignee: General Motors Corp., Detroit, Mich.

[22] Filed: Nov. 29, 1973

[21] Appl. No.: 420,219

[52] U.S. Cl. ............... 123/8.05, 123/8.09, 123/8.13
[51] Int. Cl. ........................................... F02b 53/10
[58] Field of Search ....... 123/8.13, 8.05, 8.07, 8.01, 123/8.45, 75 B, 51 AC, 53 R, 53 A, 53 BP, 57 A, 32 ST

[56] References Cited
UNITED STATES PATENTS

| | | | |
|---|---|---|---|
| 3,361,119 | 1/1968 | Foxley-Conolly | 123/8.45 X |
| 3,476,092 | 11/1969 | Yamamoto | 123/8.13 UX |
| 3,508,530 | 4/1970 | Clawson | 123/8.13 X |
| 3,785,352 | 1/1974 | Date | 123/8.13 |
| 3,805,747 | 4/1974 | Nakagawa | 123/8.13 |

*Primary Examiner*—Clarence R. Gordon
*Attorney, Agent, or Firm*—Charles R. Engle

[57] ABSTRACT

A rotary internal combustion engine having an even number of rotors planetating relative to and cooperating to drive a crankshaft within an engine housing. An axially extending auxiliary chamber is provided in the housing with each end connecting with a corresponding separate engine rotor cavity through an ignition throat passage. A piston freely reciprocates within the chamber dividing it into separate precombustion chambers for the corresponding rotor cavities. The precombustion chambers receive a rich air fuel charge which is ignited and expands into their corresponding rotor cavity igniting a main air fuel charge. The free piston is responsive to pressure differentials existing between the rotor cavities in which the rotors are phased to provide specific pressure differentials reciprocating the piston after ignition in each cavity. Movement of the piston in response to the pressure differentials is effective to sweep out the burned gases in the particular precombustion chamber into the rotor cavity. The rotor them moves the burned gases discharging them through the engine exhaust system.

3 Claims, 3 Drawing Figures

ROTARY ENGINE WITH PISTON SCAVENGED PRECOMBUSTION CHAMBERS

This invention relates to the scavenging of precombustion chambers in a rotary internal combustion engine and more specifically to the utilization of a free piston reciprocating within a dual precombustion chamber moving the burned gases out of each chamber.

Stratified internal combustion engines are becoming more prominent as exhaust emission standards become more rigid. This is due to the apparent capability of stratified engines to burn a fuel charge over a longer time period at a lower temperature thereby reducing the nitrous oxides discharged in engine exhaust gases.

One method of obtaining a stratified air fuel charge in an internal combustion engine is to provide a precombustion chamber connected with a main combustion cavity through a throat passage. The precombustion chamber receives a relatively rich air fuel charge, which can be as rich as two to one air fuel ratio, from a separate supply source. When the main air fuel charge is compressed, the rich charge is ignited and the burning gases expand through the throat passage igniting the main charge. This method of igniting with the main charge is sometimes referred to as torch ignition.

One problem arising with a precombustion chamber in fluid connection with the main combustion chamber is that the precombustion chamber is subjected to the pressures developed in the main combustion chamber. For this reason it is necessary to inject fuel into the precombustion chamber under pressure. Also, the pressures from the main combustion chamber tend to prevent outward flow of exhaust gases from the precombustion chamber This problem is particularly prevalent in rotary internal combustion engines because it is easier to position the precombustion chamber adjacent the main chamber for ignition of the charge therein. Of course by being positioned near the main combustion chamber, the precombustion chamber continually receives fluids under pressure from the main chamber. Rotation of the rotor into the exhaust and inlet cycles closes off the precombustion chamber preventing the inlet vacuum from being effective to evacuate exhaust gases in the precombustion chamber. This problem is overcome by the structure of the present invention in that an auxiliary chamber extending across two rotor cavities is provided in an engine housing. A piston is freely slidably disposed within the chamber dividing it into two separate precombustion chambers being sealed apart by rings on the piston. Each precombustion chamber connects with a corresponding rotor cavity through a throat passage. Spark plugs and fuel injectors are each positioned in the housing to service a corresponding precombustion chamber.

The rotors are phased to create a pressure differential across the piston moving it from one precombustion chamber to the other. The spark plug ignites a rich charge in the precombustion chamber and the main charge is ignited as the burning gases flow through the throat passage. The rotors continue rotation and change the pressure differential across the piston moving it into the precombustion chamber, where the burning has occurred, scavenging the exhaust gases into the associated rotor cavity. The rotor then carries the gases to exhaust with the main charge exhaust gases.

Accordingly, a prime object of our invention is the provision of a simple, economical and positive means of scavenging precombustion chambers in a rotary internal combustion engine.

Another object of our invention is the provision of a precombustion chamber scavenging means taking advantage of a pressure differential created between two separate rotors in a multi-rotor internal combustion engine.

A further object of the present invention is the provision of a freely slidable piston disposed within an auxiliary chamber in an engine housing being responsive to pressures created by separate engine rotors on each end and moving to scavenge exhaust gases in precombustion chambers on either end of the piston.

Still another object of the present invention is the provision of an auxiliary chamber in a rotary internal combustion engine housing extending axially across two separate rotor cavities, a free piston being slidably disposed within the auxiliary chamber and dividing it into separate precombustion chambers one for each rotor cavity, the auxiliary chamber having a fuel injector and a spark plug mounted near each end for pressure supplying a rich air fuel mixture into each precombustion chamber and ignition of the same when the respective rotors have compressed a main air fuel mixture in their associated working chambers, a throat passage being provided between the precombustion chambers and their respective rotor cavities whereby the burning rich mixture torch ignites the main mixture and a pressure differential existing between the separate rotor cavities moves the free piston to scavenge the burned gases out of the respective precombustion chambers.

The novel features which we believed to be characteristic of our invention are set forth with particularity in the appended claims. Our invention itself, however, both as to its organization and method of operation, may best be understood with reference to the following description taken in connection with the accompanying drawings in which:

Figure 1:
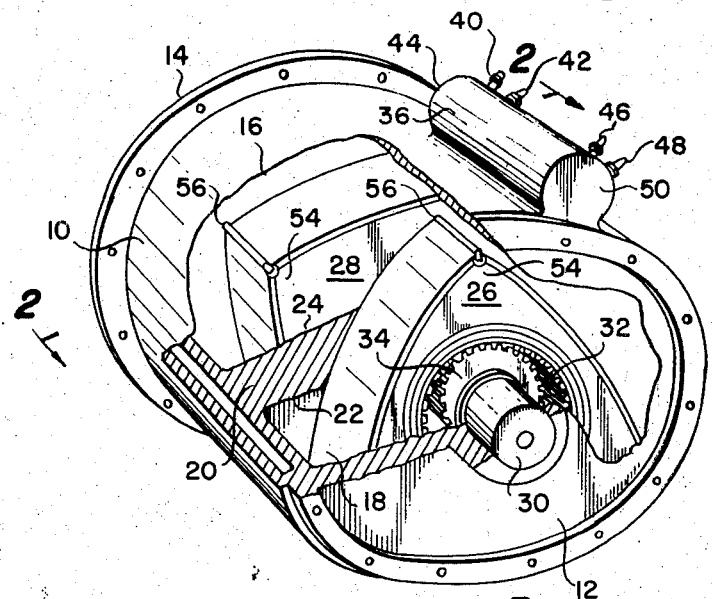
FIG. 1 is a perspective view partially in section illustrating a two rotor internal combustion engine incorporating the piston scavenge precombustion chambers in accordance with our invention.

Referring now to FIG. 1, a two rotor internal combustion engine includes an engine housing 10 enclosed by end walls 12 and 14. The housing 10 is divided into separate rotor cavities 16 and 18 by a web member 20 defining intermediate walls 22 and 24. Rotors 26 and 28 are mounted for rotation within cavities 16 and 18 and planetate relative to crankshaft 30 by virtue of engagement of rotor mounted phasing gears 32 with gears 34 fixed to the engine housing. The gears phasing rotor 28 are not shown.

Figure 2:
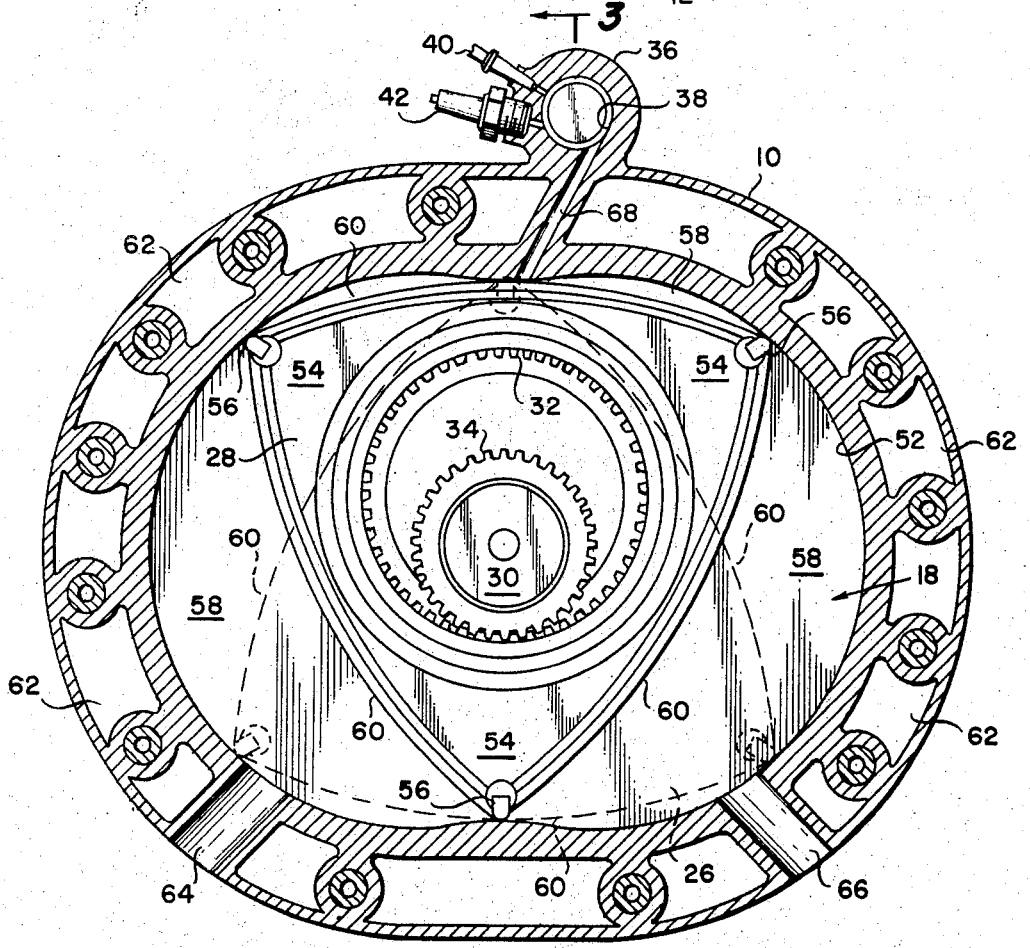
FIG. 2 is a cross sectional view taken on line 2—2 of FIG. 1.
Figure 3:
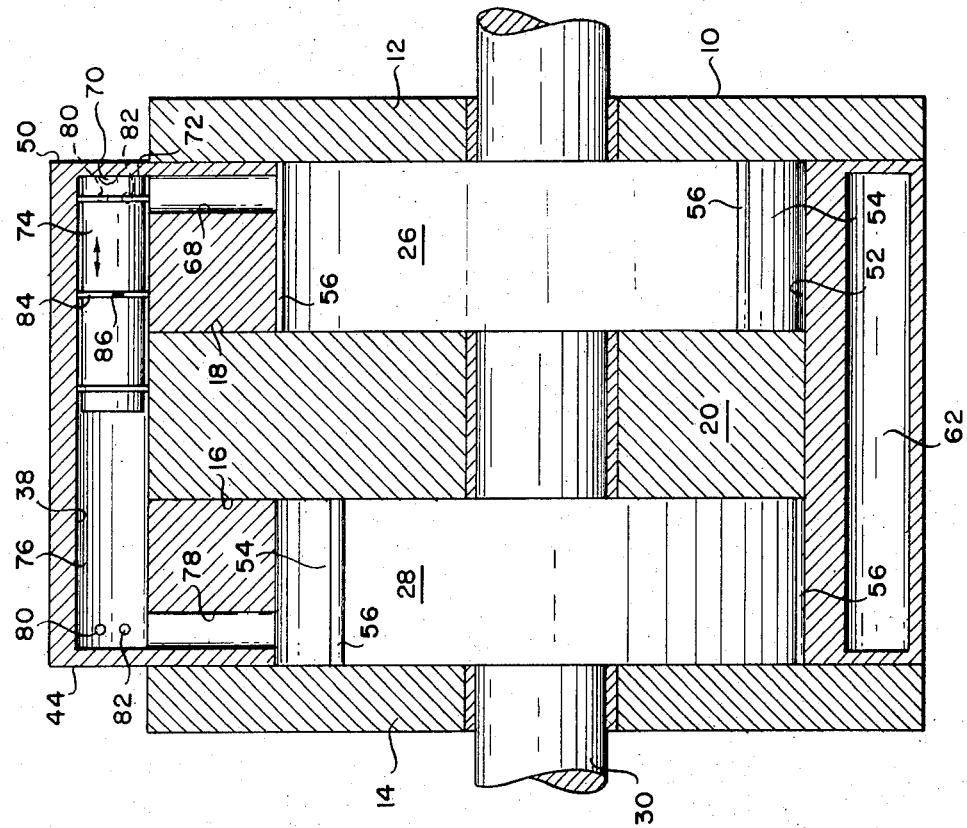
FIG. 3 is a cross sectional view taken on line 3—3 of FIG 2.

The engine housing 10 includes an integral or otherwise secured cylindrical axially extending housing 36 defining an auxiliary chamber 38 best illustrated in FIGS. 2 and 3. Continuing with reference to FIG. 1, the axially extending housing 36 has a fuel injector 40 and a spark plug 42 mounted adjacent a first end 44 while a second fuel injector 46 and a second spark plug 48 are mounted adjacent a second end 50.

Referring now to FIG. 2, the engine housing 10 defines a trochoidal chamber 52 containing the rotors 26 and 38 which are separated by the intermediate web 20 as described in FIG. 1. The rotors 26 and 28 are triangularly shaped terminating in apexes 54 containing conventional seals 56 providing a fluid sealed working chamber 58 on each peripheral surface 60 of the rotors 26 and 28. The working chambers 58 move with the respective peripheral working surfaces 60 and vary in volume as the rotors planetate relative to the crankshaft 30. As can be seen in FIG. 2, the rotor 28 is in a predetermined out-of-phase relationship with the rotor 26 which is shown in phantom in this figure. The engine housing 10 includes the usual cooling passages 62 supplying coolant around the entire periphery of the trochoidal cavity 52. The engine housing 10 contains an inlet port 64 slightly past bottom dead center and also contains an exhaust port 66 just prior to bottom dead center. The auxiliary chamber 38 connects with the working chamber 58 adjacent the minor axis of the trochoidal cavity 52 when the chamber 58 is at a minimum volume while its associated peripheral surface 60 is at top dead center as shown in relation to rotor 28 in FIG. 2. The working chamber 58 connects with auxiliary chamber 38 through a throat passage 68.

With reference now to FIG. 3, the throat passage 68 connects rotor cavity 18 with a precombustion chamber 70 normally existing between end 72 of a freely slidable piston 74 and end 50 of housing 36. The piston 74 divides the auxiliary chamber 38 into the two fluid sealed precombustion chambers including chamber 70 and a second chamber 76. The second precombustion chamber 76 connects with rotor cavity 16 through a second throat passage 78. The cylindrical axially extending housing 36 contains the aforementioned fuel injectors 40 and 46 as well as corresponding spark plugs 42 and 48 which are positioned in the housing to connect with fuel supply ports 80 and sparking ports 82. The piston 74 includes a plurality of sealing rings 84 disposed in annular grooves 86 providing a fluid tight seal between the precombustion chamber 70 and 76.

In operation, with rotor 28 in the position shown in FIG. 2 when a peripheral surface 60 is at top dead center reducing the volume of working chamber 58 to a minimum, a maximum pressure is applied through throat passage 78 moving the piston 74 to the right in auxiliary chamber 38. At this time the rotor 26 is in the position in phantom, shown in FIG. 2, and the relatively low pressure is supplied through throat passage 68 into precombustion chamber 70. Consequently, the pressure differential across the piston is such that it is moved to the position shown. A relatively rich air fuel mixture is supplied to precombustion chamber 76 and is ignited by its corresponding spark plug 42 through sparking port 82 whereupon the burning gases expand through throat passage 78 and ignite the compressed lean mixture in chamber 58 adjacent peripheral surface 60. Continued rotation of the rotors 26 and 28 result in an expansion of the working chamber 58 adjacent the near top dead center position of rotor 28 reducing the pressure in precombustion chamber 76. While this pressure is being reduced rotor 26 rotates causing its peripheral surface 60 to approach the top dead center position thereby reducing the volume in the associated work chamber 58 so as to increase the pressure supplied through throat passage 68 to precombustion chamber 70. At some point during this rotation of the two rotors 26 and 28 the pressure differential will shift and greater pressure will be applied in precombustion chamber 70. This pressure will be effective to move the piston 74 to the left toward end 44 of the axially extending housing 36 in the auxiliary chamber 38. As the piston 74 moves to the left it sweeps out the exhaust gases present in precombustion chamber 76 which are forced through throat passage 78 into rotor cavity 16. Continued rotation of the rotor 28 picks up these gases and eventually moves them along with the exhaust gases from the burned relatively lean main fuel charge through exhaust port 66.

From the above description it is apparent that our invention provides a means for positively removing any exhaust gases present in either of the precombustion chambers 70 or 76. This result is accomplished by taking advantage of the pressure differential developed between two separate rotors cooperating to drive a common crankshaft wherein they are intentionally cyclically positioned out of phase for smooth engine operation. The rich mixture injected into a particular precombustion chamber is specifically timed to occur while a main relatively lean air fuel charge is being compressed by a corresponding rotor surface. Ignition of the rich mixture is also precisely timed so that the burning rich mixture is effective to expand through a corresponding throat passage and torch ignite the compressed main charge. Continued rotation of the rotors then positively changes the pressure differential across the freely slidable piston which is moved to sweep out the burned gases in the particular precombustion chamber. This feature is particularly significant in that the precombustion chambers are in continual fluid communication with rotor cavities 16 and 18. The presence of the positive pressure makes it necessary to inject fuel under pressure through the fuel injectors 40 and 46 and also prevents a problem in eliminating any lingering exhaust gases in the precombustion cavities 70 and 76. Consequently, by providing a freely movable piston 74 in auxiliary chamber 38 so that it defines the two separated precombustion chambers 70 and 76 results in advantageous results which do not require use of any movable engine parts or drive mechanisms to accomplish the desired feature of removing exhaust gases from the chambers.

While we have shown and described a particular embodiment of our invention it will, of course, be understood that various modifications and alternative constructions thereof may be made without departing from the true spirit and scope of our invention and that we intend by the appended claims to cover all such modifications and alternative constructions as fall within the true spirit and scope of our invention.

We claim:

1. A rotary internal combustion engine comprising a housing including opposed end walls and intermediate walls in conjunction with peripheral walls defining an even number of rotor cavities, a rotor in each of said cavities, an exhaust system in said housing, a crankshaft, an eccentric on said crankshaft for each of said rotors, means supplying a main relatively lean air fuel charge to each of said cavities, said rotor planetating relative to said crankshaft on said eccentrics as each rotates within its respective housing cavity compressing the main air fuel charge for combustion therein, an auxiliary chamber formed in said engine housing, a first throat passage in said housing connecting a first end of said auxiliary chamber with one of said rotor cavities, a second throat passage in said engine housing connecting a second end of said auxiliary chamber with another of said rotor cavities, a piston freely slidably positioned within said auxiliary chamber for reciprocal movement therein, said piston dividing said auxiliary chamber into first and second precombustion chambers, said rotors being phased relative to each other on said crankshaft creating a different pressure on each end of said piston through said throat passages moving said piston expanding one of said precombustion chambers while compressing the other, means periodically and sequentially supplying a rich air fuel charge to said precombustion chambers while the corresponding rotor is compressing the lean air fuel charge in its rotor cavity, and means periodically and sequentially igniting the rich air fuel charge whereby the burning gases expand through the corresponding throat passage into the associated rotor cavity igniting the main air fuel charge while further rotation of the rotors changes the pressures in the precombustion chambers moving said piston toward an opposite end of said auxiliary chamber sweeping out the burned gases into a corresponding rotor cavity for discharge through said engine exhaust system.

2. A rotary internal combustion engine comprising a housing including opposed end walls and intermediate walls in conjunction with separate central peripheral walls defining an even number of rotor cavities, a rotor in each of said cavities, an exhaust system in said housing, a crankshaft, an eccentric on said crankshaft for each of said rotors, means supplying a main relatively lean air fuel charge to each of said cavities, said rotors planetating relative to said crankshaft on said eccentrics as each rotates within its respective housing cavity compressing the main air fuel charge for combustion therein, an auxiliary chamber formed in said engine housing and extending axially thereof across two of said rotor cavities, a first throat passage in said housing connecting a first end of said auxiliary chamber with one of said rotor cavities, a second throat passage in said engine housing connecting a second end of said auxiliary chamber with another of said rotor cavities, a piston freely slidably positioned within said auxiliary chamber for reciprocal movement therein, said piston dividing said auxiliary chamber into first and second precombustion chambers, means selectively supplying a rich air fuel charge to said precombustion combustion said first and second rotors being phased creating a pressure differential between said first and second precombustion chambers moving said piston compressing the rich air fuel mixture in the corresponding precombustion chamber on one end of said piston as each rotor compresses the main air fuel charge in its respective cavity, and means igniting the rich charge whereby the burning gases expand through the said corresponding throat passage into the associated rotor cavity igniting the main relatively lean air fuel charge therein, continued rotation of the rotors changing the pressure differential in said first and second precombustion chambers moving said piston sweeping out burned gases on one end of said piston into the corresponding rotor cavity from which it is exhausted by the corresponding rotor while a rich air fuel mixture is compressed for ignition and combustion in a subsequent cycle on the opposite end of said piston.

3. A rotary internal combustion engine including a piston scavenged precombustion chamber comprising a housing including opposed end walls and intermediate walls in conjunction with separate central peripheral walls defining separate first and second rotor cavities; an exhaust system in said housing; first and second rotors each in corresponding cavities; a crankshaft; an eccentric on said crankshaft for each of said rotors; means sequentially and periodically supplying a main relatively lean air fuel charge to each of said cavities; said rotors planetating relative to said crankshaft on said eccentrics as each rotates within its corresponding cavity cooperating with said housing defining moving working chambers of varying volume providing intake, compression, expansion and exhaust cycles during each rotor revolution; an auxiliary chamber in said housing extending axially across said rotor cavities; a piston freely reciprocably disposed within said auxiliary chamber; a plurality of sealing rings in the outer peripheral surface of said piston; said piston and said sealing rings dividing said auxiliary chamber into separate first and second fluid sealed precombustion chambers at each end thereof; said first precombustion chamber being connected with said first rotor cavity through a first throat passage in said housing; said second precombustion chamber being connected with said second rotor cavity through a second throat passage in said housing; said first and second rotors being phased relative to each other creating a pressure differential across the piston by the pressures applied in the corresponding first and second precombustion chambers alternately reciprocating said piston from one end of said auxiliary chamber to the other; a spark plug in each of said first and second precombustion chambers; a fuel injector in each of said first and second precombustion chambers; means sequentially and periodically supplying fuel under pressure to said fuel injectors providing a rich air fuel charge for combustion in said first precombustion chamber when said first rotor is compressing the lean main charge; and ignition control means firing said first spark plug igniting said rich charge causing burning gases to expand into said first rotor cavity and working chamber igniting said lean charge; continued rotation of said first and second rotors changing the pressure differential across said piston in said first and second precombustion chambers moving said piston into said first precombustion chamber sweeping the burned gases out of said chambers into said first rotor cavity for discharge by said first rotor into said engine exhaust system.

* * * * *